United States Patent

Maren et al.

[11] Patent Number: 5,850,625
[45] Date of Patent: Dec. 15, 1998

[54] SENSOR FUSION APPARATUS AND METHOD

[75] Inventors: Alianna J. Maren, Hixson, Tenn.; Richard M. Akita, Carlsbad, Calif.; Bradley D. Colbert, Oakton, Va.; David J. Donovan, Hixson, Tenn.; Charles W. Glover, Knoxville, Tenn.; Karl Mathia; Robert M. Pap, both of Chattanooga, Tenn.; Kevin L. Priddy, Signal Mountain, Tenn.; Timothy W. Robinson; Richard E. Saeks, both of Chattanooga, Tenn.

[73] Assignee: Accurate Automation Corporation, Chattanooga, Tenn.

[21] Appl. No.: 819,980

[22] Filed: Mar. 13, 1997

[51] Int. Cl.$^6$ .................................................. H04N 5/272
[52] U.S. Cl. .......................... 702/93; 702/179; 382/173; 382/254; 382/162; 382/274; 706/25
[58] Field of Search .................................... 364/570, 554, 364/581, 582; 382/254, 274, 263, 162, 173; 395/61, 24; 702/93; 706/25

[56] References Cited

U.S. PATENT DOCUMENTS

| 5,005,147 | 4/1991 | Krishen et al. | 364/578 |
|---|---|---|---|
| 5,140,416 | 8/1992 | Tinkler | 358/88 |
| 5,210,798 | 5/1993 | Ekchian et al. | 382/14 |
| 5,218,440 | 6/1993 | Mathur | 358/213.27 |
| 5,247,584 | 9/1993 | Krogmann | 382/14 |
| 5,276,770 | 1/1994 | Castelaz | 395/23 |
| 5,293,455 | 3/1994 | Castelaz | 395/24 |
| 5,351,311 | 9/1994 | Rogers et al. | 382/45 |
| 5,361,328 | 11/1994 | Takatori et al. | 395/22 |
| 5,481,646 | 1/1996 | Furuta et al. | 395/27 |
| 5,482,314 | 1/1996 | Corrado et al. | 280/735 |
| 5,488,589 | 1/1996 | DeAngelis | 367/131 |
| 5,517,667 | 5/1996 | Wang | 395/24 |
| 5,537,511 | 7/1996 | DeAngelis et al. | 395/22 |
| 5,548,683 | 8/1996 | Engel et al. | 395/21 |
| 5,548,685 | 8/1996 | Wang | 395/24 |
| 5,555,324 | 9/1996 | Waxman et al. | 382/254 |
| 5,611,502 | 3/1997 | Edlin et al. | 250/251 |
| 5,631,970 | 5/1997 | Hsu | 382/113 |

*Primary Examiner*—John Barlow
*Assistant Examiner*—Hien Vo
*Attorney, Agent, or Firm*—Law Office of Jon M. Jurgovan

[57] ABSTRACT

The invented apparatus fuses two or more sensor signals to generate a fused signal with an improved confidence of target existence and position. The invented apparatus includes gain, control and fusion units, and can also include an integration unit. The integration unit receives signals generated by two or more sensors, and generates integrated signals based on the sensor signals. The integration unit performs temporal and weighted spatial integration of the sensor signals, to generate respective sets of integrated signals supplied to the gain control and fusion units. The gain control unit uses a preprogrammed function to map the integrated signals to an output signal that is scaled to generate a gain signal supplied to the fusion unit. The fusion unit uses a preprogrammed function to map its received integrated signals and the gain signal, to a fused signal that is the output of the invented apparatus. The weighted spatial integration increases the fused signal's sensitivity to near detections and suppresses response to detections relatively distant in space and time, from a detection of interest. The gain control and fusion functions likewise suppress the fused signal's response to low-level signals, but enhances response to high-level signals. In addition, the gain signal is generated from signals integrated over broad limits so that, if a detection occurred near in space or time to a detection of interest, the gain signal will cause the fused signal to be more sensitive to the level of the detection of interest.

31 Claims, 7 Drawing Sheets

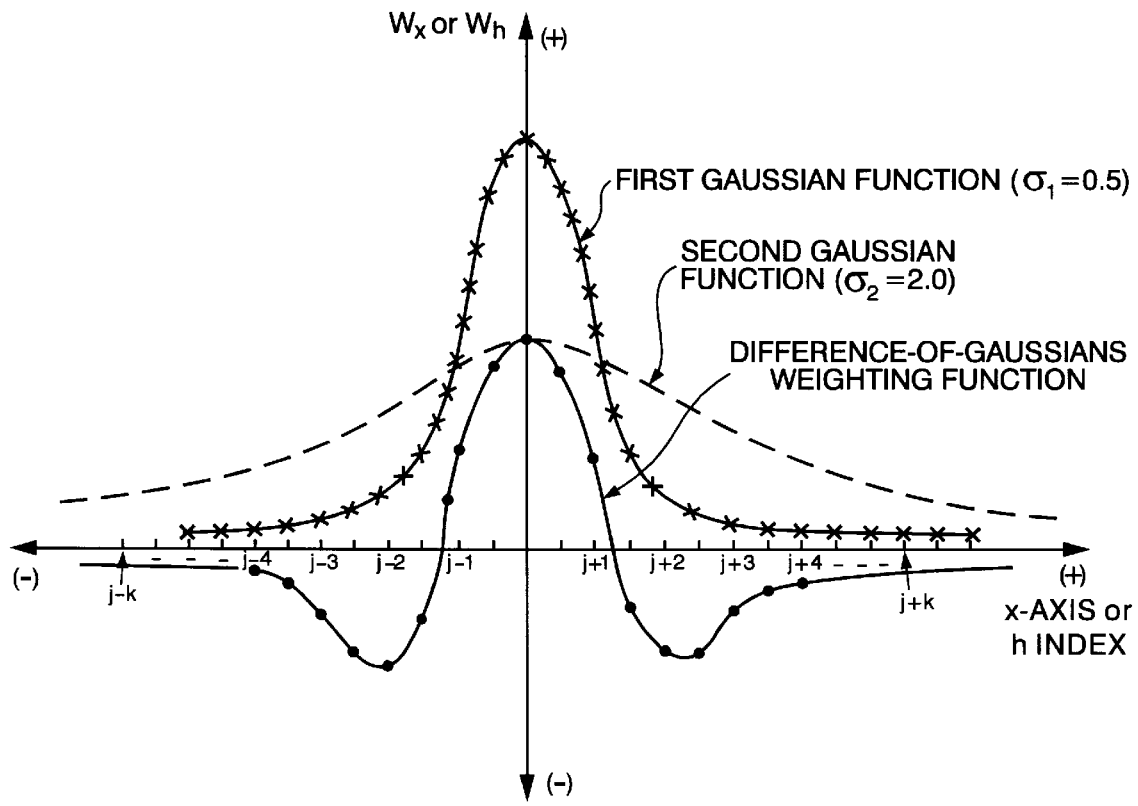
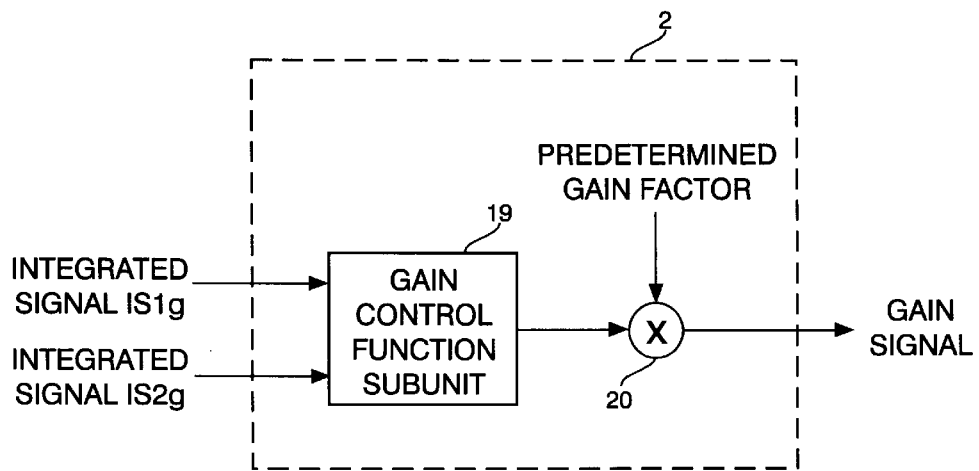
Fig. 7

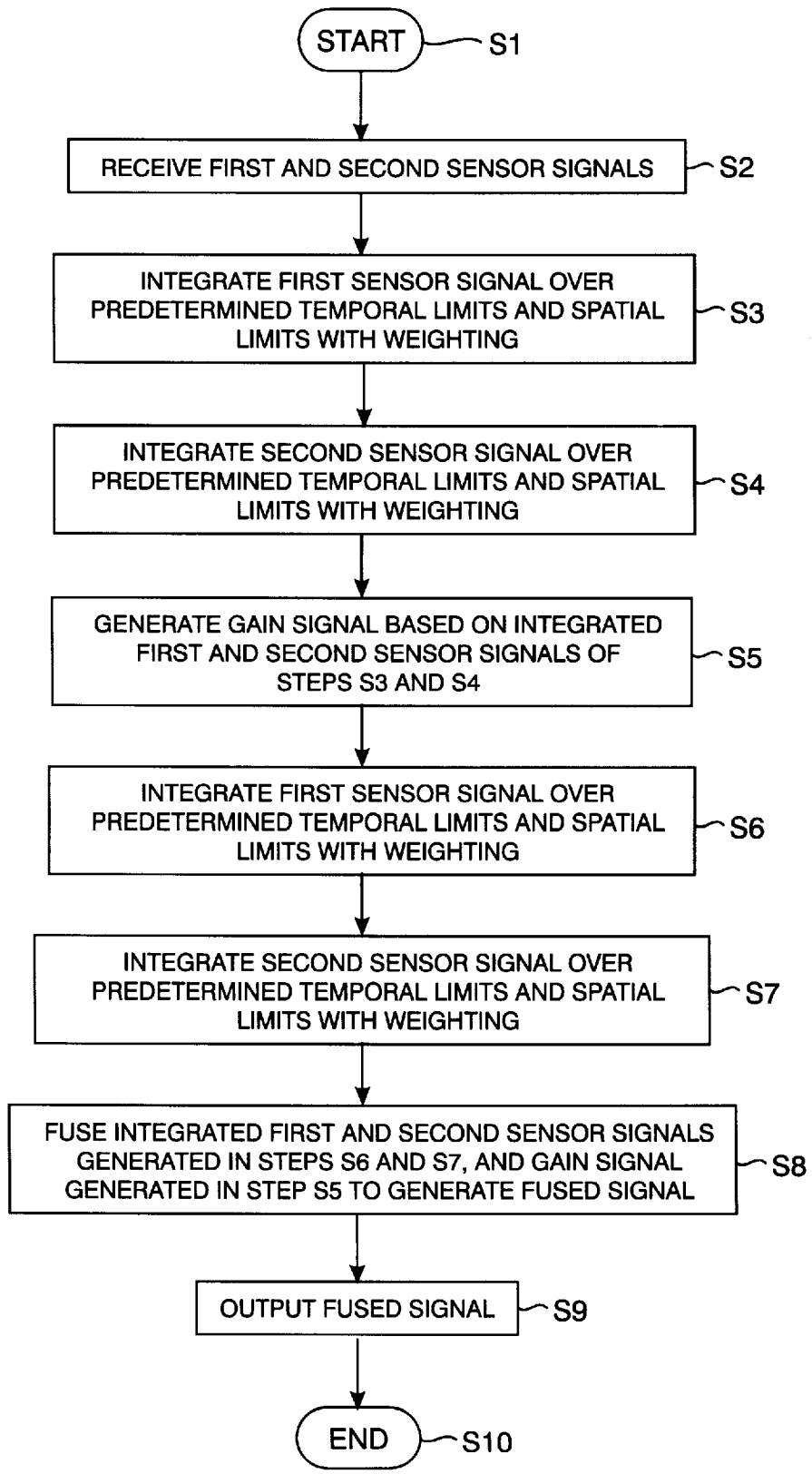

SENSOR FUSION APPARATUS AND METHOD

STATEMENT OF GOVERNMENT RIGHTS IN THE INVENTION

This invention was developed under a Small Business Technology Transfer (STTR) project funded by the U.S. Government as represented by the Department of the Navy under Contract Nos. N00014-94-C-0156 and N00014-95-C-0323. The U.S. Government has certain rights in the invention.

BACKGROUND OF THE INVENTION

1. Field of the Invention

This invention is directed to an apparatus and method for fusing signals from two or more sensors that observe a target(s), in order to improve confidence of target existence and position at a given time. The invention is also directed to an apparatus and method capable of determining whether closely spaced sensor detections are the same target or distinct targets that are relatively close to each other.

2. Description of the Related Art

There are many applications for tracking targets with sensor devices. For example, in commercial aviation, to coordinate the use of an airfield and to prevent collisions, radar devices are typically used to track aircraft in proximity to the airfield. In military applications, targets are tracked through a variety of sensor devices such as radar, sonar, or optical devices such as video, laser or infrared detectors, for example. The targets of interest can be moving objects such as ships, submarines or aircraft, or can be stationary objects such as an airfield, building or geographic feature. Further, the sensor devices can be mounted to a stationary or moving platform.

Often, in such applications, two or more sensor devices observe the same target(s) at the same time or near-coincident times. There has recently been considerable research effort to fuse signals of two or more sensors to increase the amount of information known about a target. Although several different devices and techniques for fusing sensor signals have been proposed, such devices and techniques are relatively complicated and expensive. There is therefore a great need for a highly effective, yet relatively simple and inexpensive, device and technique for producing a fused signal.

SUMMARY OF THE INVENTION

This invention overcomes the above-noted disadvantages. An apparatus in accordance with this invention is coupled to receive first and second sensor signals from respective sensors that sense an environment in which one or more targets may exist. The apparatus includes a gain control unit coupled to receive signals based on the first and second sensor signals, that are preferably integrated versions of the two sensor signals. The gain control unit generates a gain signal based on the received signals. The gain signal influences the degree to which the apparatus will respond to a previous detection(s) or a detection(s) in spatial and temporal proximity to a particular detection in the first or second sensor signals. The apparatus also includes a fusion unit that is coupled to receive signals based on the first and second signals, that are preferably derived by integration of the sensor signals. The fusion unit is also coupled to receive the gain signal from the gain control unit. The fusion unit generates a fused signal, based on the first and second signals and the gain signal. In generating the fused signal, the fusion unit effectively combines the target information of the two sensor signals with the gain signal, so that the resulting fused signal contains more confidence as to target existence and position at a given time than is present in either sensor's signal if considered individually. The invented apparatus thus provides the capability to fuse two or more sensor signals to obtain a fused signal with relatively enhanced information of a target(s) in the sensed environment. Moreover, the invented apparatus achieves these advantages with a relatively simple, inexpensive configuration.

Preferably, the apparatus includes an integration unit coupled to receive the first and second sensor signals, and coupled to the gain control and fusion units. The integration unit generates integrated signals based on the first and second sensor signals, and supplies the integrated signals to the gain control and fusion units. The integration unit performs temporal and spatial integration of the sensor signals. The term 'integration' as used herein is not strictly limited to its mathematical definition, but includes similar summation operations as commonly understood by persons familiar with electronics and other technologies. Preferably, the integration unit performs temporal and spatial integration of the two sensor signals, separately and independently. The temporal integration is preferred to be a graded decay of signal strength. The spatial integration is preferably performed after the temporal integration, with a weighting derived by a difference-of-guassians function, for example. The weighting used by the spatial integration unit eliminates noise and conditions the first and second sensor signals to suppress response to detections at positions relatively far from a position currently under analysis, thus improving the determination of target existence at the currently-analyzed position. Also, the integration limits of the first and second sensor signals used to generate the signals output from the integration unit to the gain control unit, are preferably larger in both the temporal and spatial domains than the integration limits of the first and second sensor signals used to generate the signals supplied from the integration unit to the fusion unit. Further, the integration unit optionally uses a predetermined transfer function, preferably a range normalization or scaled sigmoid function, to generate the integrated signals.

In its preferred configuration, the gain control unit is configured to combine the signals received from the integration unit, by inputting the integrated signals into a gain control function that is preprogrammed into the gain control unit. The gain control function maps the levels of the integrated signals to a corresponding signal level that is output from the gain control function. The gain control function is preferably such that it enhances strong detections and suppresses weak detections in the integrated signals. The gain control unit further includes a multiplier that is coupled to receive the signal output from the gain control function, and that multiplies that the signal with a predetermined gain factor, to generate the gain signal that is the output of the gain control unit.

In an alternative configuration, the gain control unit combines the integrated signals input to the gain control unit by averaging the two signals, for example. The gain control unit inputs the averaged signal's level to a gain control function (which in this case is a function of a single variable) that maps the level of the averaged signal to a corresponding level that is output from the gain control function. The output of the gain control function is supplied to the multiplier that multiplies the function's output signal by the gain factor to generate the gain signal.

The fusion unit maps the levels of the signals received from the integration unit, and the level of the gain signal from the gain control unit, to a corresponding level for the fused signal output from the invented apparatus. More specifically, the fusion unit generates the fused signal based on a predetermined fusion function using the signals from the integration unit and the gain control unit. Similarly to the gain control function, the fusion function generates the fused signal so as to enhance strong detections and suppress weak detections. The fused signal is the ultimate output of the apparatus. Alternatively, the fused signal can be subjected to a final weighting similar to that used in the spatial integration, that is configured to sharpen the location of detections in the fused sensor signal.

The apparatus can also include the first and second sensors that sense the environment and that generate respective first and second sensor signals supplied to the integration unit.

A method in accordance with this invention includes a step of generating a gain signal, based on first and second sensor signals. The method also includes a step of generating a fused signal, based on the first and second sensor and gain signals. The steps of generating the gain and fused signals can be performed with respective predetermined gain control and fusion functions to eliminate noise and sharpen the fused signal to improve the confidence of its target information. The invented method can also include steps of integrating the first and second sensor signals for use in generating the gain signal and the fused signal. Preferably, the spatial and temporal limits of integration for the first and second sensor signals used to generate the integrated signals supplied to generate the gain signal, are larger than those of the integrated signals supplied to generate the fused signal. Therefore, the integrated signals used to generate the gain signal can be influenced by detections more distant in space or time as compared to the integrated signals used to generated the fused signal. In addition, the method can include a step of weighting that is performed for at least one of the first and second signals during the performance of the steps of integrating the first and second sensor signals. The weighting of the signal(s) can be performed with weight levels derived from a difference-of-gaussians or other similar function. The method can also include a step of using a transfer function, for example, a range normalization or scaled sigmoid function, to generate at least one of the integrated first and second signals used in the performance of the integration steps.

Advantageously, the invented apparatus and method can be used to preferentially extract relatively weak signals from a noisy background due to the spatial and temporal integration of the sensor signals. At the same time, the influence of non-normal (e.g., Rayleigh) noise is mitigated. Another significant advantage of the invented apparatus and method is the capability to fuse signals from different sensors even if the two signals are displaced in time or space by a relatively slight amount. Accordingly, perfect relative registration of the sensors is not required for effective implementation of the invented apparatus and method, thus making feasible its use in a wide variety of applications, ranging from fusion of radar and/or Information-Friend-or-Foe (IFF) target detections, to fusing results from different methods of locating point source targets, such as dead reckoning with use of transponders or Global Positioning System (GPS) coordinates. The invented apparatus and method can therefore yield a fused signal with relatively high-fidelity target location, whether the targets are on land or sea, or in the air. Further, the invented apparatus and method can be used to generate a fused signal that is more indicative of whether the target exists and its position at a given time, than either of the first and second signals considered individually. Also, the fused signal generated by the invented apparatus and method can distinguish closely spaced targets or conclude that closely spaced detections are the same target with a confidence improved relative to the confidences of the two sensor signals. In addition, the invented apparatus and method is a relatively simple, yet highly effective, in generating a fused signal with comparatively precise, high-resolution target information.

These together with other features and advantages, which will become subsequently apparent, reside in the details of construction and operation of the invented apparatus and method as more fully hereinafter described and claimed, reference being made to the accompanying drawings, forming a part hereof, wherein like numerals refer to like parts throughout the several views.

BRIEF DESCRIPTION OF THE DRAWINGS

FIG. 6 is a view of a difference-of-gaussians weighting function used in the spatial integration unit of FIG. 5;

FIG. 7 is a relatively detailed block diagram of the gain control unit of FIG. 3;

FIG. 11 is a flow chart of a method in accordance with this invention.

DESCRIPTION OF THE PREFERRED EMBODIMENTS

1. General Description of the Invented Apparatus and Method

Figure 1:
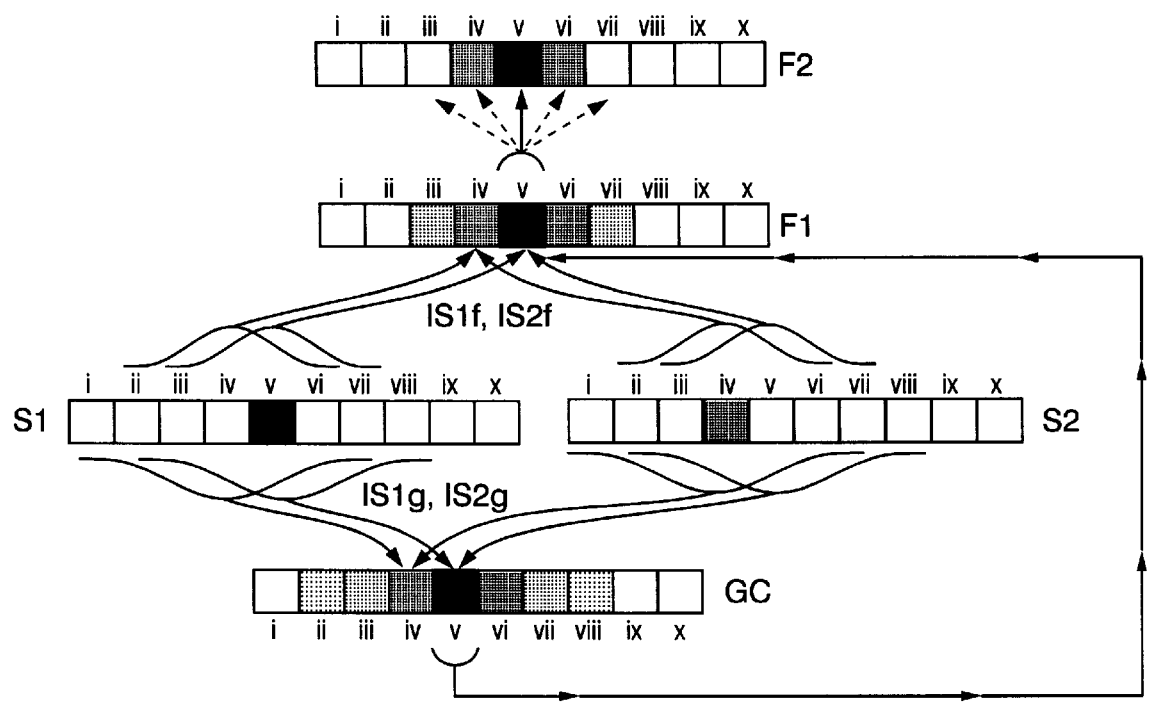
FIG. 1 is an exemplary schematic view of one-dimensional processing of first and second sensor signals to generate a fused signal indicative of the existence and position of a target at a particular time, in accordance with the invented method and apparatus.

FIG. 1 shows exemplary processing of two sensor signals to generate a fused signal indicative of the existence and position of a target at a particular time, in accordance with the invented apparatus and method. The sensor signals can be generated by the same or different types of sensors. The two sensors are registered relative to one another, preferably in advance of operation, so that they view the same portion of an environment, or 'field', in which targets are to be detected. In the preferred configuration, the two sensors have the same resolution, where 'resolution' connotes the number of resolution elements (bins or pixels, for example) per unit of the sensed field. The two sensors preferably also have the same response so that for a given input level, the two sensors output the same output level.

The invented apparatus and method can, however, be readily adapted for sensors with different resolutions or responses. For example, the responses of both sensors to a known environment distribution, can be compared and used to register, apportion and scale the signals generated by the two sensors. To apportion one sensor's resolution to another sensor's resolution, one of the sensor signals or outputs, preferably that with the least number of resolution elements per unit increment of the sensed field, is selected as a reference sensor. Based on their respective output signals, the non-reference sensor's resolution elements are associated with those of the reference sensor's signal by comparing the two signals responses to the environment's known feature distribution. The comparison of the two sensors' output signals generated from the known environment distribution, can be compared, and selectively attenuated or enhanced so that the two sensors' output signals will have the same level in response to a target in the sensed field. Preferably, the preregistration, apportionment, and scaling are performed in advance of operation of the invented apparatus and method. Furthermore, the preregistration, apportionment and scaling functions can be readily automated by appropriate programming of a processor used in the invented apparatus or to practice the subject invention (such as the processor in the implementation of FIG. 10, for example) so that no direct adjustment of the position, gain or the like of the two sensors is required so long as they both sense the field of interest.

Typically, the sensor signals are divided by unit increments that each include a predetermined number of resolution elements. Although resolution elements of the sensor signals can include pixels from video or optical sensors, or bins from radar or sonar, for simplicity, the sensor signals' resolution elements will be referred to as 'cells' hereinafter. The term 'cells' as used herein is thus intended to have a broad meaning, and includes bins, pixels or other resolution elements within the scope of its definition.

Initially, to simplify the introduction of the preferred embodiments of the invented apparatus and method, in FIG. 1, the two sensor signals (denoted 'S1' and 'S2') are one-dimensional and divided into only ten cells each representing a corresponding increment of space of the sensed environment. Actually, for most applications, the preferred number of cells is typically significantly larger than that shown in FIG. 1. However, the simplification of the sensor signals to only ten cells has been adopted herein to allow the invented apparatus and method to be more readily understood. The extension of the invented apparatus and method to more than ten cells per sensor signal, and to two- or three-space dimensions, will subsequently become apparent from this disclosure.

In FIG. 1, the first sensor signal indicates a detection at cell v (counting from left to right), and the second sensor signal indicates a detection at cell iv. The detection of the first sensor signal S1 has a higher confidence of target existence and position at cell v than the second sensor signal S2 is confident of the target's position at cell iv, as indicated by the comparatively dark shading of cell v of the first sensor signal S1. The sensors' signals are integrated over a first set of spatial and temporal limits using a weighting function for the spatial integration, and optionally a predetermined transfer function, to generate a first set of integrated signals IS1$g$, IS2$g$. The first set of integrated signals IS1$g$, IS2$g$ are effectively combined, for example, by application of a predetermined gain control function, and scaled with a predetermined gain factor, to generate a gain signal in the gain control processing (designated 'GC') of the invented apparatus and method. The gain signal has cells corresponding to those of the two sensor signals, but has a more gradational or smooth variation of cell confidence levels relative to the sensor signals. The sensors' signals are also integrated over a second set of spatial and temporal limits to generate a second set of integrated signals (designated 'IS1$f$' and 'IS2$f$' in FIG. 1) supplied for fusion processing (designated 'F1' and 'F2'). Preferably, the second set of limits is smaller in the spatial and temporal domains compared to the limits used by the gain control unit. The fusion processing combines the second set of integrated signals IS1$f$, IS2$f$ modulated by the influence of the gain signal GC, to generate a fused signal F1. The output of the fusion unit is the fused signal F1. The fused signal F1 can extend over multiple cells due to the influence of the weighting function applied during spatial integration. Optionally, the fused signal F1 can be sharpened using cooperative-competitive weighting similar to that performed in the spatial integration to produce a fused signal F2 that is more localized relative to the signal F1. The resulting sharpened signal F2 can be output as the fused signal. Unless specifically stated to the contrary in this document, reference to the 'fused signal' will include within its meaning either of the fused signals F1 or F2. The fused signal (i.e., the signal F1, or alternatively, the signal F2) is the ultimate output of the invented apparatus and method. The fused signal has a relatively high confidence level of the existence of the target at cell v, that is greater than the confidence levels of either sensor signal considered alone. The fused signal indicates relatively low confidence levels of target presence at cells iv and vi, and even less probability of target presence in cells i–iii and vii–x.

The integration, gain control and fusion functions implemented in respective units can be constructed so as to serve different purposes. For example, the integration, gain control and fusion functions can either serve to allow a strong response to any target signal presented to either sensor, or can be constructed so as to give a strong response only when a target is detected by both sensors in relatively close spatial and temporal proximity. In addition, the integration, gain control and functions can be implemented in respective units to be more responsive to one sensor relative to the other. Thus, if one sensor indicates that a target exists at a given cell while the other indicates no or low-probability of target existence, the processing of the invented apparatus and method can, dependent on the configuration of the fusion and gain control functions programmed into the apparatus, nonetheless make a determination as to whether there is a target in the sensed environment. In addition, if two closely spaced detections are observed by one or both sensors, there can be ambiguity as to whether one or more than one target are present in the environment. The integration, gain control and fusion functions implemented in the invented apparatus and method can be applied to resolve the ambiguity present in each of the sensor signals, to establish whether only one, or two or more closely-spaced targets, are present in the sensed environment.

2. The Invented Apparatus

Figure 2:
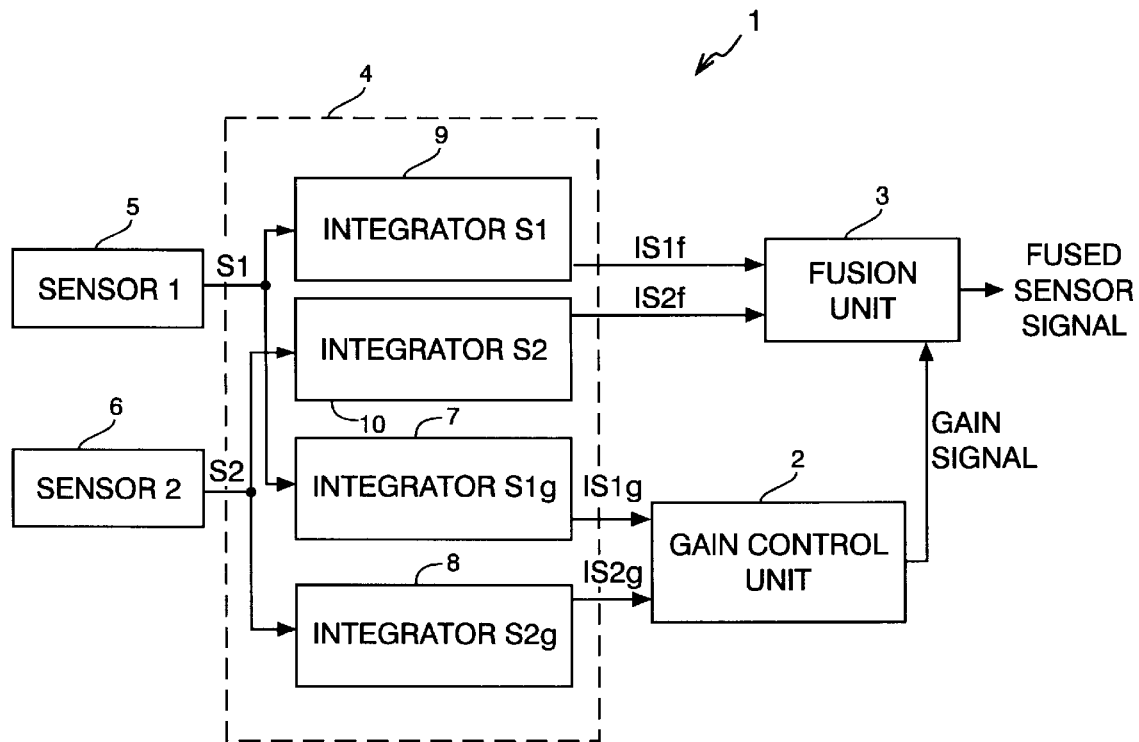
FIG. 2 is a general block diagram of the invented apparatus.

In FIG. 2, a general block diagram of the invented apparatus 1 is shown. The apparatus generally includes a gain control unit 2 and a fusion unit 3. The apparatus can also include an integration unit 4, and first and second sensors 5, 6. The first and second sensors are positioned to sense the same portion or field of an environment for a target(s). Based on the sensed environment, the first and second sensors generate respective first and second sensor signals S1, S2. The first and second sensors are coupled to supply respective sensor signals to the integration unit. The integration unit preferably includes integrators 7, 8, 9, 10. The integrators 7, 8 are coupled to receive the first and second sensor signals S1, S2, respectively, and integrate these signals over a first set of temporal and spatial integration limits. The integrators 7, 8 are coupled to output respective integrated signals IS1g, IS2g to the gain control unit 2. The integrators 9, 10 are coupled to receive the first and second sensor signals, respectively, and integrate these signals over a second set of temporal and spatial integration limits. Preferably, the second set of integration limits is smaller in the spatial and temporal dimensions than the first set of integration limits. The integrators 9, 10 are coupled to output respective integrated signals IS1f, IS2f to the fusion unit 3. In the preferred embodiment, the integrators 7–10 use weighting in the performance of the spatial integration to eliminate the influence upon a cell under current analysis, from detections at cells that are relatively distant from the currently-analyzed cell. The integrators 7–10 are optionally programmed with a predetermined transfer function to generate respective integrated signals based on the first and second sensor signals. The use of the transfer function influences the fusion function to a degree. The preferred transfer function used by the integrators 7–10 is a range normalized or scaled sigmoid function.

The gain control unit 2 is coupled to receive the integrated signals IS1g, IS2g from the integration unit 4, or more specifically, from the integrators 7, 8. The gain control unit effectively combines the integrated signals IS1g, IS2g using a predetermined gain control function preprogrammed into the unit 2, to generate the gain signal. In an alternative configuration, the integrated signals IS1g, IS2g can be combined in the gain control unit by averaging the two signals, and the averaged signal input to a single-variable gain control function preprogrammed into the unit 2, for the generation of the gain signal. However, in this implementation, the gain control function cannot distinguish between the effect of different sensor signal levels that average to the same level. In either of the above two alternative implementations for the gain control unit, the signal generated by the gain control unit with the gain control function is multiplied by a predetermined gain factor to generate the gain signal ultimately output by the gain control unit.

The fusion unit 3 is coupled to receive integrated signals IS1f, IS2f output from the integration unit 4, or more specifically, from the integrators 9, 10. The fusion unit is also coupled to receive the gain signal from the gain control unit 2. The fusion unit combines the second set of integrated signals IS1f, IS2f along with the gain signal to generate a fused signal that is the output signal of the invented apparatus. As an additional alternative, the fused signal can be further modulated in the fusion unit by a final stage of weighted spatial integration similar to that previously described, to localize and sharpen the fused signal ultimately output from the invented apparatus. This final stage of weighted integration uses a smaller set of weights, and more weights at the extremes of the weighting function are negative. The fusion unit is preprogrammed with a predetermined fusion function used to generate a fused signal, based on the integrated signals IS1f, IS2f and the gain signal from the unit 2. The fused signal has an improved confidence of target existence and position at a given time. The fused signal also resolves ambiguous detections of the first and second sensors, for example, to conclude whether two closely spaced detections are the same or different targets. The fusion unit can be coupled to supply the fused signal to a variety of systems that depend upon the application in which the apparatus is used. For example, for an air or ship target tracking system, the fused signal can be coupled to the tracking system for further processing and display to human controllers.

3. The Integrators

Figure 3:
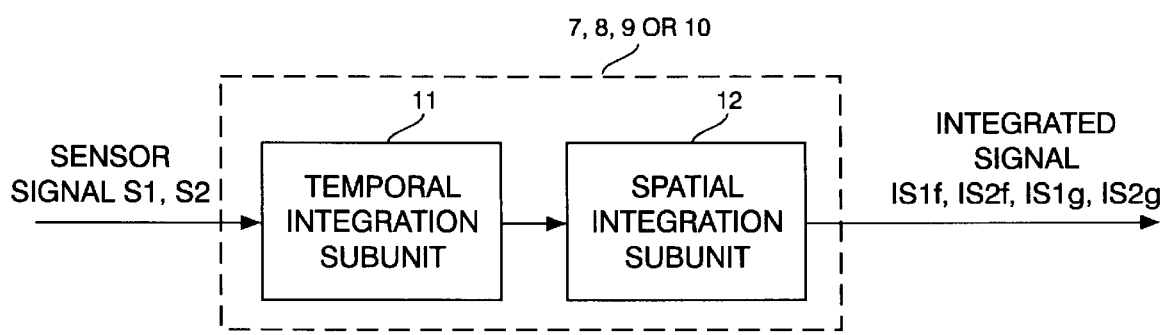
FIG. 3 is a block diagram of an integrator including temporal and spatial integration subunits; included in an integration unit of the apparatus shown in FIG. 2.

FIG. 3 is a more detailed block diagram of a preferred configuration of an integrator that can be used to implement any one of the integrators 7–10. The integrator of FIG. 3 receives one of the two sensor signals, depending upon the identity of the integrator. More specifically, if the integrator of FIG. 3 is one of the integrators 7, 9, the integrator is coupled to receive the first sensor signal S1. On the other hand, if the integrator of FIG. 3 is one of the integrators 8, 10, the integrator is coupled to receive the second sensor's signal S2. The integrator generates an integrated signal that is output to either the gain control unit 2 or the fusion unit 3, according to its implementation in the integration unit of FIG. 2. The integrator of FIG. 3 includes a temporal integration subunit 11 and a spatial integration subunit 12. The temporal integration subunit is coupled to receive either the first or second sensor signals S1, S2, and generates a temporally-integrated signal based on the received signal. Further, the temporal integration subunit is coupled to output the temporally-integrated signal to the spatial integration subunit. The spatial integration subunit performs spatial integration on the temporally-integrated signal with weighting, to generate the integrated signal ultimately output from the integrator.

Preferably, the integrator receives at regular time intervals a set of confidence levels of target existence and field position for all of the cells of the sensor signal generated by one of the two sensors. The integrator performs temporal integration individually for each cell j, where j is a position index ranging from the first to the last cell of the sensor signal. If the integrator is used to generate one of the integrated signals IS1g, IS2g supplied to the gain control unit, the integrator decay is relatively slow so that the limits of integration span a large range. If the integrator is used to generate one of the integrated signals IS1f, IS2f supplied to the fusion unit, the integrator decay is relatively rapid so that the temporal integration limits span a correspondingly short time range.

In its spatial dimension, the sensor signal input to the integrator includes the confidence levels for the cells ranging from cells j−k to j+k, where k is an integer index defining the spatial integration limits. The spatial integration subunit receives the signal from the temporal integration subunit, and spatially integrates this signal over spatial limits from h=j−k to j+k to generate the jth cell's integrated signal that is output from the integrator to one of the gain control or fusion units, depending upon the identity of the integrator. The index j is then incremented to prepare to generate the integrated signal for the next cell.

4. Temporal Integration Subunit

Figure 4:
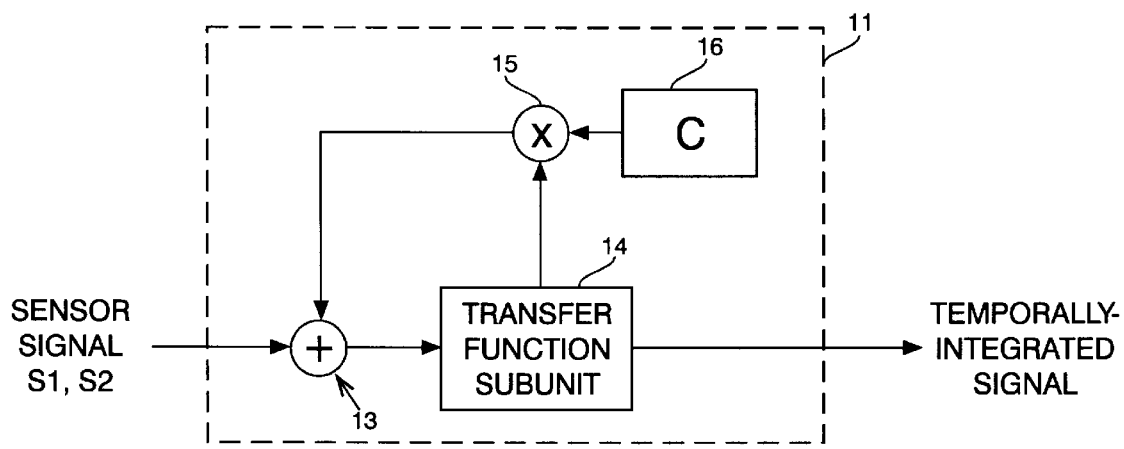
FIG. 4 is a relatively detailed block diagram of the temporal integration subunit of FIG. 3.

FIG. 4 shows an exemplary embodiment of the temporal integration subunit 11. The purpose of the temporal integration subunit is to cause a degree of persistence of a detection in the sensor signal(s) so that the invented apparatus can correlate or 'integrate' detections in the two sensor signals that occur at different times. The temporal integration subunit preferably includes an adder 13, a transfer function unit 14, a multiplier 15 and a constant generator 16. The temporal integration subunit, more specifically, the adder, is coupled to receive the sensor signal corresponding to cell j. The adder is also coupled to receive a delayed signal generated from the confidence or signal strength level of at least one previous time interval for the cell j, and generates a sum signal based on the sensor and delayed signals. The adder is coupled to output the sum signal to the transfer function unit 14 whose purpose is to limit the temporally-integrated signal within acceptable bounds so that a persistent signal does not 'flood' the following spatial integration and fusion processes implemented in the spatial integration subunit 12, or the gain control or fusion units 2, 3. The transfer function unit can be implemented as a look-up table or processor-implemented function, that outputs a confidence level for the temporally-integrated signal, based on the confidence level of the sum signal input to the transfer function. Alternatively, the unit 14 can be implemented as a processor coupled to a memory, that is programmed with the predetermined transfer function, and that evaluates the transfer function at each time interval using the sum signal's confidence level, to generate a corresponding confidence level for the temporally-integrated signal. Many functions can be used for the transfer function, and selection depends upon the sensors used, the desired characteristics of the fused signal to be output, and the application to which the invented apparatus is applied. The transfer function used by the unit 14 can be a range normalized function of the following form:

$$\text{output signal of transfer function unit} = u_{new} = \frac{u_{max} - u_{min}}{u_{old} - u_{min}} \quad (1)$$

where $u_{new}$ is the present level of the temporally-integrated signal, $u_{max}$ and $u_{min}$ are its maximum and minimum levels, respectively, and $u_{old}$ is its level during the previous time interval. Alternatively, the transfer function can be a scaled sigmoid function such as:

$$\text{output signal of transfer function unit} = \frac{1}{1 + e_{new}^{-a(u-b)}} \quad (2)$$

where $u_{new}$ is the confidence level of the sum signal at cell j, and a and b are selected based upon the application in which the apparatus is to be used. In addition, it is possible to use more than one transfer function sequentially applied to achieve a desired characteristic in the fused signal. The temporally-integrated signal generated by the unit 14 is output to the spatial integration unit 12 (not shown in FIG. 4). In addition, the temporally-integrated signal generated by the unit 14 is supplied to the multiplier 15. The multiplier 15 multiplies the temporally-integrated signal with a predetermined constant feedback factor C from unit 16, where $-1<C<0$, to generate the delayed signal. The factor C is selected to be closer to $-1$ for faster decay, and hence less sensitivity, of the temporally-integrated signal to past detections. On the other hand, if greater sensitivity to past detections is desired for a given application, the constant C is chosen to be closer to 0. The delayed signal is supplied to the adder 13 that adds the delayed signal to the confidence level for the cell j of the sensor signal for the subsequent time interval. The temporal integration subunit 11 thus allows a detection at a given cell j to persist over time for correlation with other detections in the sensor signals.

5. Spatial Integration Subunit

Figure 5:
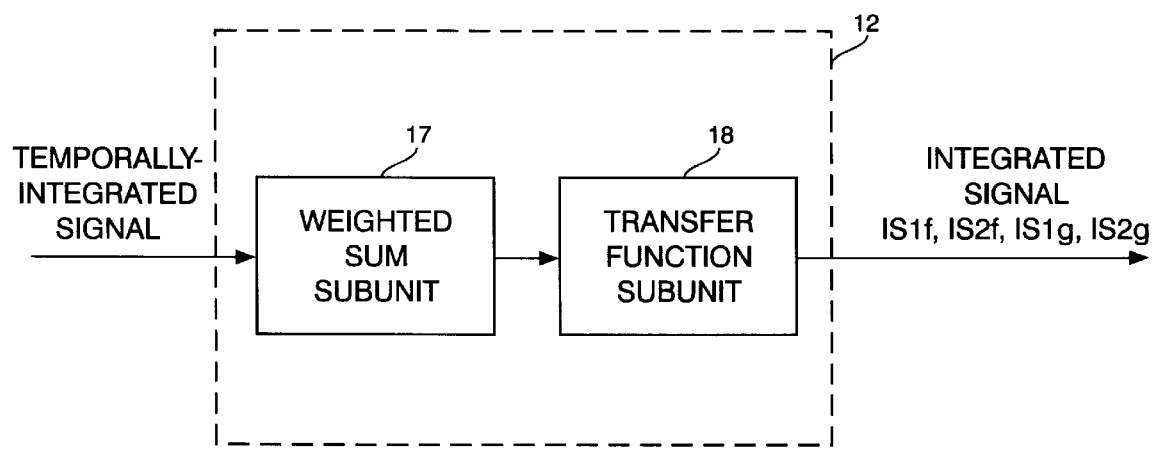
FIG. 5 is a relatively detailed block diagram of the spatial integration subunit of FIG. 3.

FIG. 5 is a relatively detailed view of the spatial integration subunit 12 of FIG. 3. The spatial integration subunit includes a weighted sum subunit 17 and a transfer function subunit 18. The spatial integration unit, or more specifically, the subunit 17, is coupled to receive the temporally-integrated signal from the unit 11. The subunit 17 weights the confidence levels of respective cells of the temporally-integrated signal, with corresponding weight factors $W_h$, to generate a weighted signal. The weight factors are defined according to a predetermined weighting function or sequence. The subunit 17 performs a spatial summation of the weighted signal over a range from h=j−k to j+k to generate a sum signal for the jth cell. The subunit 17 is coupled to output the sum signal to the transfer function subunit 18. The subunit 18 limits the integrated signal within acceptable bounds so that a persistent signal does not 'flood' the following spatial integration and fusion processes in the gain control or fusion units 2, 3.

If necessary, the spatial integration subunit 12 is configured to account for the boundaries of the signal range of the two sensor signals. For example, the sensors 5, 6 can be such that their ranges 'wrap-around' (e.g., the sensor ranges can correspond to 360 degrees of azimuth as used, for example, in many radar tracking systems) so that the cells at the edges of the signals are actually neighboring cells. In this case, the subunit 12 weights and spatially integrates the sensor signal in a wrap-around sense. If the sensor ranges do not wrap-around, the weighting and spatial integration can be truncated when applied to the boundary cells. Alternatively, the boundary cells can be extended beyond the boundaries of the sensor signal by assigning zero levels to the extended cells. The extra cells at the ends of the signal's cell range allow the performance of weighting and spatial integration over the entire range of the detected signals without truncation.

Preferably, the subunit 17 is implemented as a processor coupled to a memory, that is coupled to receive the temporally-integrated signal, and that is coupled to output the sum signal to the subunit 18. Alternatively, the subunit 17 can be implemented as a look-up table, a microcontroller, a programmable logic array, etc. Regardless of specific implementation, the subunit 17 is preferably programmed to generate the sum signal based on the temporally-integrated signal, according to the following relation:

$$\text{level of sum signal output by subunit } 17 = \sum_{h=j-k}^{j+k} W_h T_h \quad (3)$$

where $W_h$ is the weight factor for cell index h, and $T_h$ is the confidence or signal strength level of the hth cell after output from the subunit 11. For the integrators 7, 8, k is typically an integer from three to five or more, and for the integrators 9, 10, k is typically an integer from two to three or more. Of course, k can assume different values without departing from the scope of the invention. It is preferred that the k values for the integrators 7, 8 are greater than the k values for the integrators 9, 10.

The subunit 18 optionally generates the integrated signal output from the subunit 12 using a predetermined transfer function that relates the confidence level of cell j of the signal from subunit 17, to a corresponding confidence level of cell j of the integrated signal. Preferably, the transfer function used by the subunit 18 has a range normalization or scaled sigmoidal form similar to that of equations (1) or (2) as set forth hereinabove. Also, as with the subunit 17, the subunit 18 can be implemented with a processor coupled to a memory, that is coupled to receive the signal from subunit 17, and that is also coupled to output the integrated signal to one of the gain control or fusion units, as appropriate for the particular integrator. The processor is programmed with the transfer function, and evaluates the transfer function with the signal from the subunit 17, to generate the integrated signal. Alternatively, the subunit 18 can be implemented as look-up table, a microcontroller, a programmable logic array, etc. programmed with the transfer function to generate the integrated signal based on the signal from the subunit 17.

FIG. 6 shows the weighting function (or sequence) implemented in the spatial integration subunit 12. The weighting function is preferably such that it is applied over a window with a dimensionality that is the same as the dimensionality of the space observed by the sensors. In the one-dimensional implementation of the subunit 12, the window is preferred to be symmetrically arranged around a central cell j of the temporally-integrated signal that is to be used ultimately to generate a corresponding cell j in the fused signal output from the invented apparatus. The symmetric window extends k cells in either direction along the temporally-integrated signal, for a total window size of 2k+1. Preferably, each particular cell of the window has a corresponding weight level assigned to it in accordance with the evaluation of the predetermined weight function at the position corresponding to that particular cell. Also preferred, the weight levels are symmetric about the cell j so that, for example, the weight level at cell j−k is the same as that at the cell j+k. Another important property of the weight levels is that they sum or integrate to zero so that no net offset is added upon applying the weight levels to corresponding cells of the temporally-integrated signal. Moreover, the weight levels assigned to the center of the window are positive, while those away from the center are negative. In addition, the positive and negative weight levels are separately well-established, with a transition zone between the positive and negative weight levels. Accordingly, the weight levels are negative at one extreme of the window, transition to positive weight levels in the window center, and transition to negative weight levels at the other extreme of the window. One weighting function from which the weight levels can be derived is a difference-of-gaussians function, that is shown in FIG. 6. The difference-of-gaussians function is highly effective for implementation in the spatial integration subunit 12, although other functions that have similar characteristics can be used.

The difference-of-gaussians function is generated from the well-known gaussian function:

$$W(x) = \frac{1}{(2\pi)^{1/2}\sigma} \exp[-((x-\mu)/\sigma)^2/2] \quad (4)$$

where x is the analog spatial position (or, in the discrete context, the index h) of the temporally-integrated signal from the subunit 11, $\mu$ is the mean that is usually selected to be zero, and $\sigma$ is the standard deviation of the gaussian function. In accordance with this invention, the difference-of-gaussians weighting function is derived by subtracting a first gaussian function with a relatively short, broad form (i.e., a relatively large standard deviation) from a second gaussian function with a relatively narrow, tall form (i.e., a relative small standard deviation), to obtain a difference-of-gaussians weighting function as shown in FIG. 6. Thus, the difference-of-gaussians function W has a form:

$$W(x) = f_1(x) - f_2(x) = f(\sigma_{x1}, x) - f(\sigma_{x2}, x) = \quad (5)$$

$$\frac{1}{(2\pi)^{1/2}\sigma_{x1}} \exp[-((x-\mu_x)/\sigma_{x1})^2/2] -$$

$$\frac{1}{(2\pi)^{1/2}\sigma_{x2}} \exp[-((x-\mu_x)/\sigma_{x2})^2/2].$$

where $\sigma_{x2} > \sigma_{x1}$, and $f_1(x)$ (or equivalently $f(\sigma_{x1}, x)$) and $f_2(x)$ (or equivalently $f(\sigma_{x2}, x)$) are derived from equation (5).

The difference-of-gaussians weighting function has several important properties. More specifically, the difference-of-gaussians weighting function is bilaterally symmetric, meaning that it is symmetric about the x-axis (or discrete h index) dimension as well as the weight factor $W_x$ or $W_h$ level-axis of the output of the subunit 17. As such, the difference-of-gaussians weighting function adds no net offset to the signal output from the subunit 17 along either the x-axis or the weight factor level-axis. Moreover, the difference-of-gaussians weighting function enhances response of the cell of current interest (i.e., the jth cell) while suppressing response of the signal generated by the subunit 17 to detections in cells not in near spatial vicinity to the jth cell (in other words, in those regions adjacent the weighting function's peak where the function has relatively large negative values). This feature eliminates noise in the vicinity of a target so that its position at a given time can be more readily determined, and also so that two closely spaced targets can be more effectively distinguished. For example, choices for the standard deviations of the two gaussians used to generate the weighting function can be $\sigma_{x1}=0.5$ and $\sigma_{x2}=2.0$.

Although the difference-of-gaussians function is preferred for the weighting function implemented by the weighted sum subunit 17, other weighting functions can be effectively used. The preferred characteristics for the weighting function are that it be such that it has relatively large positive values at and in close proximity to the jth cell, and relatively large negative values at positions relatively distant from the jth cell. In addition, the weighting function should be bilaterally symmetric so that it introduces no offset when multiplied with the temporally-integrated signal to generate the signal output from the subunit 17 to the subunit 18.

6. Gain Control Unit

FIG. 7 is a block diagram of an exemplary embodiment of the gain control unit 2. The gain control unit includes a gain control function subunit 19 and a multiplier 20. The subunit 19 is coupled to receive the integrated signals IS1g, IS2g. The subunit 19 is preprogrammed with a gain control function that maps the confidence levels of the integrated signals IS1g, IS2g to a corresponding level for the signal output from the subunit 19. The subunit 19 is coupled to supply its output signal to a multiplier 20. The multiplier 20 multiplies the signal from the subunit 19 with a predetermined gain factor, to generate the gain signal for cell j. The predetermined gain factor is preprogrammed into the subunit 19, and is positive and less than one. The gain factor controls the proportion to which the gain control unit 2 will respond to a particular detection and other detections proximate to that particular detection, and can be adjusted to achieve a desired affect. For example, in the preferred configuration in which the gain signal is more responsive to distant temporal and spatial detections as compared to the integrated signals IS1f, IS2f, if it is desired for the fused signal to be more responsive to detections relatively distant in time or space, the gain factor is increased. Conversely, to de-emphasize the response of the apparatus to detections more distant in space or time from the particular detection, the gain signal can be set to a relatively low level. The multiplier is coupled to output the gain signal to the fusion unit 3.

Preferably, the gain control function subunit 19 and the multiplier 20, are implemented as a processor coupled to a memory, that is coupled to receive the integrated signals IS1g, IS2g and that is further coupled to output the gain signal to the fusion unit 3. If so implemented, the control program stored in the memory and that is used to control the processor, is preprogrammed with the predetermined gain control function and gain factor, and is also preprogrammed to implement the above-described functions of the subunit 19 and the multiplier 20. Of course, the gain control unit 2 can be implemented with appropriate programming, in a look-up table, a microcontroller, or a programmable logic array, for example.

Figure 8A:
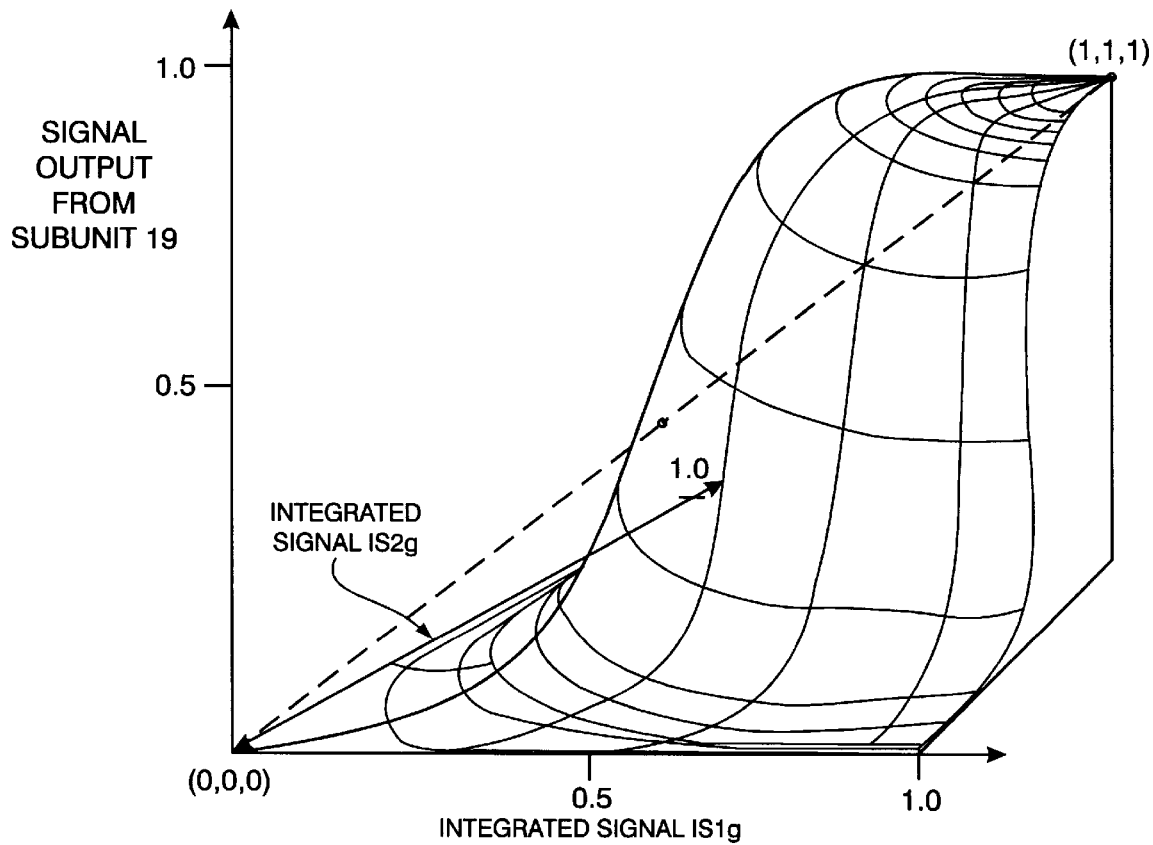
FIGS. 8A and 8B are graphs of a gain control function used in the gain control unit of FIG. 7.
Figure 8B:
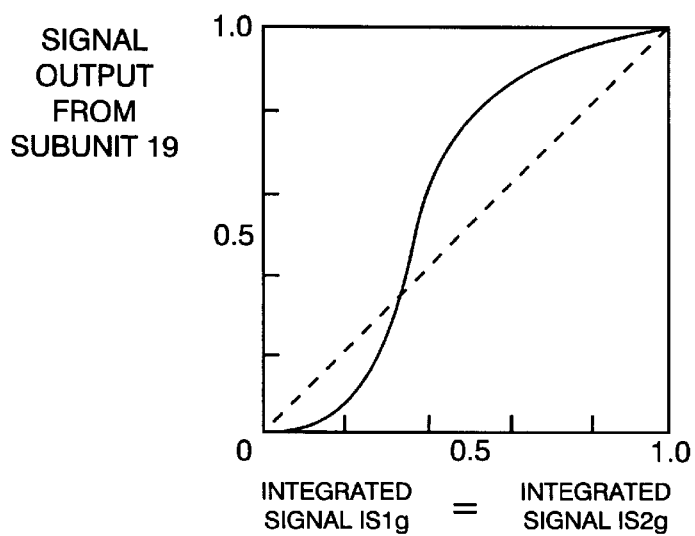

FIGS. 8A and 8B are graphs of the gain control function used in the subunit 19. The two abscissas of the gain control function are the levels of the integrated signals IS1g, IS2g and the ordinate of the gain control function is the level of the signal output by the subunit 19. The gain control function is programmed into the device(s) (a processor and memory, for example) used to implement the subunit 19. As can be seen from FIGS. 8A and 8B, if the integrated signals IS1g, IS2g have relatively low levels along respective abscissa axes, the subunit 19 uses the programmed gain control function to generate a corresponding gain signal level at the ordinate axis that has an even lower level relative to the integrated signals IS1g, IS2g. On the other hand, if the integrated signals IS1g, IS2g for cell j have relatively high levels, the subunit 19 uses the preprogrammed gain control function to generate a corresponding gain signal with an even higher confidence level as compared with the two integrated signals. Thus, the gain control function sharpens the signal, so as to generate the gain signal in a manner that enhances high confidence levels and suppresses low confidence levels. An implementation of the gain control and fusion units can be programmed with a combination of different gain control and fusion functions to obtain various capabilities as described above. Accordingly, an operator of the apparatus can select from among the various gain control and fusion functions to obtain a desired effect in the fused signal output from the apparatus.

The preferred configuration for the gain control function can depend upon a number of factors, including the particular types of sensors used, the desired behavior and characteristics of the fused signals in response to these sensors, and the application to which the invented apparatus is to be applied. The integrated signals input to the gain control function are preferably (although not necessarily) normalized by the optional transfer function subunit 18, for example, so that if the integrated signals' levels are zero or negative, they are transformed to zero as an output signal level of the function. Conversely, if the integrated signals' levels are both one or greater than one, the output signal level of the transfer function is one. In between these two extrema, the gain control function varies continuously and monotonically. The gain control unit preferably assigns zero levels to negative integrated signal levels that can occur if the subunit 18 and its normalizing function are omitted. Further, if the integrated signals are not normalized, then the gain control function preferably scales the output signal to account for the levels if the input integrated signals, and the desired performance of the apparatus, for example. One possible implementation of the gain control function is the multiplication of two sigmoids (see equation (2)) based on the levels of the two integrated signals input to the function.

The gain control function can be configured in a variety of ways to affect the manner and degree to which the integrated signals IS1g, IS2g will impact the signal output from the subunit 19. For example, if the fused signal is desired to be more responsive to the integrated signal IS1g than signal IS2g, the contour of the surface corresponding to the output signal level of the gain control function can be configured to rise rapidly along the output signal's ordinate axis relatively close to the integrated signal IS1g in FIG. 8A as compared to surface contour near the level axis of the integrated signal IS2g. Also, for example, if it is known that a detection is a relatively reliable indication of target presence at or above a particular level of one of the two integrated signals, the gradient of the output signal surface in FIG. 8A can be made to rise steeply at and above that particular level to make the fused sensor signal more sensitive to such integrated signal. Conversely, if an integrated signal is not a reliable indicator of target existence or position over some of its levels, the surface can be configured to de-emphasize the fused signal output that would arise from the inconclusive sensor signal input.

7. Fusion Unit

Figure 9:
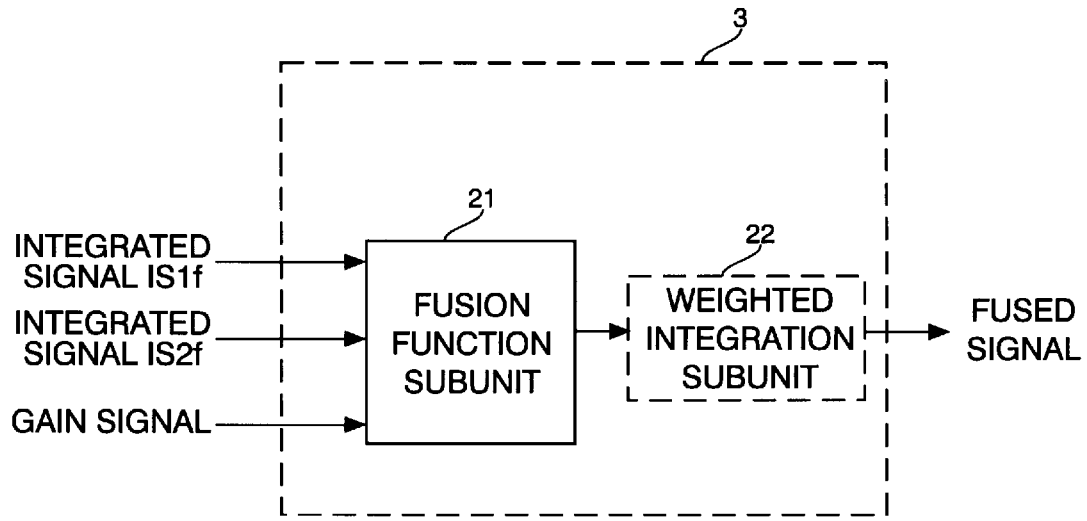
FIG. 9 is a relatively detailed block diagram of the fusion unit of FIG. 3.

FIG. 9 is a block diagram of the fusion unit 3. The fusion unit generally includes a fusion function subunit 21. The fusion unit is coupled to receive the integrated signals for cell j from the integrators 9, 10 as well as the gain signal for cell j from the gain control unit 2, and generates the fused signal based on the signals received by the unit 2. The subunit 21 is programmed preferably in advance of operation with a predetermined fusion function similar to the two-dimensional gain control function of FIG. 8, but extended to three abscissa dimensions to account for the levels of the two integrated signals IS1f, IS2f, and the level of the gain signal from the gain control unit 2. The fusion function is configured based on similar considerations as the gain control function, and can be made to be more or less responsive to one or more of the gain or integrated sensor signals as compared to the others. In addition, if it is known that a detection is a relatively reliable indication of target presence at or above a particular level of one of the gain or integrated signals, the fusion function can be programmed to be relatively responsive to such signal at or above that level. Conversely, if the gain or integrated signals is not a reliable indicator of target existence or position over some of its levels, the fusion function can be structured so as to de-emphasize the fused signal output that would arise from the inconclusive sensor signal input. In addition, there can be more than one programmed fusion function, so that the operator can select the fusion function that provides the most desired results for a particular application.

The levels of the integrated signals IS1f, IS2f and the gain signal map via the fusion function to an ordinate dimension corresponding to the level of the fused signal output from the invented apparatus. Because it has four dimensions, the fusion function cannot be readily illustrated, and accordingly, is not shown in the Figures. The fusion function is generally such that, if the levels of the integrated signals IS1f, IS2f and the gain signal from the unit 2 are at relatively low levels along respective abscissa dimensions, the corresponding ordinate level for the fused signal has an even lower level. Contrarily, if the integrated signals IS1f, IS2f and the gain signal from the unit 2 have relatively high levels along respective abscissa dimensions, the corresponding level of the fused signal has an even higher level than those of the integrated signals and the gain signal.

The fusion function is preferably implemented so the gain signal has an additive effect upon each of the integrated signals IS1f, IS2f that are input to the fusion function. For example, if the fusion function is configured by the multiplication of two sigmoids (see equation(2)), one for each of the integrated signals IS1$f$, IS2$f$, the gain signal can be implemented as the parameter b in the sigmoid functions. The gain signal thus conditions the response of the fused signal to current integrated signal levels IS1$f$, IS2$f$, based on previous detections or detections in near spatial proximity to the cell j for which the fusion function is being evaluated. The gain signal thus increases the sensitivity of the fused signal level if previous detections have occurred in near spatial or temporal proximity to the cell j, and yet inhibits detections relatively distant in time or space from impacting response of the fused signal generated for cell j.

Preferably, the fusion function subunit 21 is implemented as a processor coupled to a memory. The processor is coupled to receive the integrated signals from the integrators 9, 10 and the gain signal from the gain control unit 2, and is preferably coupled to output the fused signal for cell j to an external system, depending upon the application to which the invented apparatus is applied. For example, the fused signal can be output to a target tracking system to monitor target position and movement in an environment. Through a control program stored in the processor's memory, the processor implements the above-described function of the subunit 21.

In an alternative configuration, the fusion unit can include a weighted integration subunit 22 similar in structure and operation to the subunit 17 previously described. However, the subunit 22 is programmed with a predetermined weighting function that has a more narrow window and more peaked central positive region, than that implemented in the subunit 17, and thus has a relatively pronounced sharpening or localizing affect upon application to the signal from the subunit 21. The subunit 22 is coupled to receive the output signal from the fusion function subunit 21, and generates a sharpened fused signal based on the signal from the subunit 21 and its weighting function. The sharpened fused signal is the output of the fusion unit 3 and the invented apparatus in this alternative embodiment. Other sharpening functions can also be used without changing the overall nature of this method.

8. A Preferred Implementation of the Invented Apparatus

Figure 10:
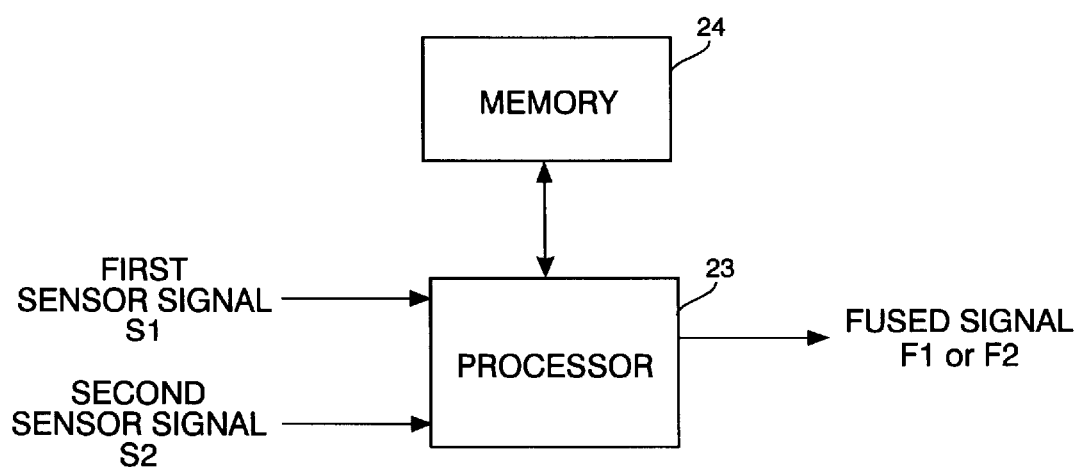
FIG. 10 is a general block diagram of a preferred implementation of the invented apparatus.

The apparatus of FIG. 2 can be implemented with a single processor 23 coupled to a memory 24, as shown in FIG. 10. The processor 23 is coupled to receive the sensor signals and coupled to output the fused signal to an external system. In most applications, the number of cells in the sensor signals are much greater than the ten shown in FIG. 1, and accordingly the processing load on the processor can be such that it cannot generate an output in a sufficiently short period of time. In this case, a parallel array of processors such as the NNP® processor board commercially-available from Accurate Automation™ Corporation of Chattanooga, Tenn., can be used to implement the invented apparatus. In the preferred configuration, each processor of the array is designated to generate the fused output signal from the sensor signals, for a corresponding cell or group of cells. Parallel processing can thus be used in the invented apparatus for relatively rapid generation of the fused signal. The processors preferably receive respective sensor signal confidence levels and generate corresponding fused signal confidence levels at regular time intervals. For most applications, such time intervals are preferably less than one second in duration.

Although the exemplary processing of the invented apparatus as shown in FIG. 1 is performed with signals of only ten cells, the preferred number of cells is preferably more than ten for most applications. The size of the field of the environment that can be sensed with the apparatus, as well as the resolution of target position at a given time, depend upon the number of cells per unit of sensed field, and accordingly a particular application can demand that the number of cells be on the order of hundreds or thousands, or more.

9. Adaptation of Invented Apparatus to Process Two-Dimensional Sensor Signals The invented apparatus can be readily expanded to process sensor signals that have two- or three-dimensions. In the two-dimensional case, the first and second sensor signals each have confidence levels for a two-dimensional array defined by orthogonal x- and y-axes for an analog signal, or discrete h and p indexes for a digital signal. As with the one-dimensional digital case, these two-dimensional cell arrays are apportioned and scaled by the apparatus so that cells of the two arrays correspond to a similarly-sized portion or field of the environment, and so that their confidence levels are equivalently scaled. In most respects, the apparatus configured to process two-dimensional sensor signals differs little from the one-dimensional implementation of the invented apparatus. After receiving confidence level samples of the sensor signals, the integrators of the unit 4 perform temporal integration for each of the cells in the array. The integrators of the unit 4 also programmed to perform discrete spatial integration according to the relation:

$$\text{sum signal output by subunit } 17 = \sum_{p=l-m}^{l+m} \sum_{h=j-k}^{j+k} W_{h,p} T_{h,p} \quad (6)$$

where h is the index along the x-axis direction, p is the index along the y-axis direction of the cell array for the sensor signals, j is the x-axis position of the cell for which the fused signal is generated, l is the y-axis position of the cell for which the fused signal is generated, k is the range of spatial integration in the x-axis direction, and m is the range of spatial integration in the y-axis direction. In the preferred embodiment, m is equal to k. $W_{h,p}$ is the weight factor for cell indices h, p, that is derived from a weighting function preferably similar to that described with respect to FIG. 6 and relation (6), and in addition, that includes an additional weighting function for the y-axis (or p index) dimension. More specifically, for the y-axis dimension, the weighting function can be a difference-of-gaussians function of the form:

$$F = f_1(y) - f_2(y) = f(\sigma_{y1}, y) - f(\sigma_{y2}, y) = \quad (7)$$
$$\frac{1}{(2\pi)^{1/2}\sigma_{y1}} \exp[-((y-\mu)/\sigma_{y1})^2/2] - \frac{1}{(2\pi)^{1/2}\sigma_{y2}} \exp[-((y-\mu)/\sigma_{y2})^2/2].$$

in which one gaussian function is subtracted from another to generate a difference-of-gaussians function for the y-axis, where y is the confidence level field position along the y-dimension of the temporally-integrated signal from the temporal integration subunit 11, $\mu_y$ is the mean that is usually selected to be zero, and $\sigma_{y1}$, $\sigma_{y2}$ are the respective standard deviations of the gaussian functions used to generate the difference-of-gaussians function. For example, the standard deviations of the two gaussians used to generate the weighting function can have respective values of $\sigma_{y1}$=0.5 and $\sigma_{y2}$=2.0. In relation (6), $T_{h,p}$ is the confidence level of the hth and pth cell of the temporally-integrated signal from the subunit 11. Similarly to the one-dimensional case, the index m is preferably on the order of three to five or more if used in the integrators 7, 8 and two or three or more if used in the integrators 9, 10 with the index m for the integrators 7, 8 preferred to be higher than that for the integrators 9, 10. The output of the integrators 7–10 based on relation (6) are output to respective gain control and fusion units. In the subunit 19, the levels of the integrated signals are mapped cell-by-cell to a corresponding cell level of the signal output from the subunit 19, based on the predetermined gain control function. The signal generated by the subunit 19 is output to the multiplier 20 that multiplies the confidence levels for all cells by the predetermined gain factor to generate the gain signal output from the gain control unit 2. The fusion unit is coupled to receive the integrated signals from the integrators 9, 10 and the gain signal, and maps the levels of the received signals to a corresponding fused signal level for all cells in the integrated signals and the gain signal. The resulting fused signal thus effectively fuses the two-dimensional sensor signals from the sensors 5, 6.

10. Adaptation of Invented Apparatus to Process Three-Dimensional Sensor Signals The invented apparatus can be readily extended to process sensor signals with three-dimensional cell arrays in a manner that logically follows from the two-dimensional case. More specifically, in the three-dimensional case, the first and second sensor signals each have confidence levels for three-dimensional analog x-, y- and z-axes or discrete h-, p-, q-index arrays of cells. In the preferred digital implementation, the cells of the two three-dimensional cell arrays can be registered, apportioned and scaled by the apparatus so that cells of the two arrays span a similarly-sized portion or field of the sensed environment, and so that their confidence levels are equivalently scaled. In most respects, the apparatus configured to process three-dimensional sensor signal arrays is similar to the previously-described one- and two-dimensional cases. After receiving confidence level samples of the sensor signals, the integrators of the unit 4 perform temporal integration for each of the cells in the received three-dimensional array. The integrators of the unit 4 are programmed to perform spatial integration according to the relation:

$$\text{sum signal output by subunit 17} = \sum_{s=q-r}^{q+r} \sum_{p=l-m}^{l+m} \sum_{h=j-k}^{j+k} W_{h,p,s} T_{h,p,s} \qquad (8)$$

where h is the index along the x-axis direction of the sensor signals, p is the index along the y-axis direction of the cell array for the sensor signals, s is the index along the z-axis direction of the sensor signals, j is the x-axis position of the cell for which the fused signal is generated, k defines the range of spatial integration along the x-axis dimension, l is the y-axis position of the cell for which the fused signal is generated, m defines the range of spatial integration in the y-axis direction, q is the z-axis position of the cell for which the fused signal is generated, and r defines the range of spatial integration in the z-axis direction. $W_{h,p,s}$ is the weight factor for cell indices h, p, s, and is derived as described with respect to FIG. 6 and relations (5) and (7), and in addition, for the z-axis (or s index) dimension, a weighting function such as a difference-of-gaussians function of the form:

$$W(z) = f_1(z) - f_2(z) = f(\sigma_{z1}, z) - f(\sigma_{z2}, z) = \qquad (9)$$

$$\frac{1}{(2\pi)^{1/2} \sigma_{z1}} \exp[-((z - \mu_z)/\sigma_{z1})^2/2] -$$

-continued $$\frac{1}{(2\pi)^{1/2} \sigma_{z2}} \exp[-((x - \mu_z)/\sigma_{z2})^2/2].$$

where z is the position of the input signal along the z-axis (or discrete s index) dimension, $\mu_z$ is the mean that is usually selected to be zero, $\sigma_{z1}$ is the standard deviation of the first gaussian function, and $\sigma_{z2}$ is the standard deviation of the second gaussian function, and where $\sigma_{z2} > \sigma_{z1}$. For example, the two gaussians that are subtracted to generate the weighting function can have respective standard deviations of $\sigma_{z1}=0.5$ and $\sigma_{z2}=2.0$. In relation (8), $T_{h,p,s}$ is the confidence level of the hth and pth cell of the temporally-integrated signal from the subunit 11. In the preferred embodiment, k, m, and r are equal. Preferably, the indices k, m, and r are each on the order of three to five or more if used in the integrators 7, 8 and two or three or more if used in the integrators 9, 10. Thus, the indices for the integrators 7, 8 are preferred to be larger than those for the indices 9, 10. The output of the integrators 7–10 based on relation (8) are output to respective gain control and fusion units. The subunit 19 of the gain control unit 2 maps the confidence levels of the integrated signals IS1g, IS2g cell-by-cell to corresponding levels of the signal output from the subunit 19, based on the gain control function. The signal from subunit 19 is supplied to the multiplier 20 that multiplies all cells of the signal from the subunit 19 by the predetermined gain factor to generate the gain signal. The fusion unit is coupled to receive the integrated signals IS1f, IS2f and the gain signal from the gain control unit 2, and maps the confidence levels of these three-dimensional signals cell-by-cell to corresponding cells of the fused signal, based on the predetermined fusion function. The resulting three-dimensional fused signal thus fuses the three-dimensional sensor signals from the sensors 5, 6.

11. Invented Method

FIG. 11 is a flowchart of processing performed by the invented method. The processing of FIG. 11 parallels, and thus describes, the processing performed by, and the operation of, the invented apparatus (e.g., the processing of FIG. 11 can be programmed into and performed by the processor 23 and memory 24 of FIG. 10). The invented method begins in step S1. In step S2, the first and second sensor signals are received. Preferably, in step S2, the integration unit receives the confidence levels for all of the cells in the respective cell arrays from the sensor signals generated by the sensors 5, 6. If necessary, the processor performing the invented method registers, scales and apportions the two sensor signals so that corresponding cells of the two cell arrays of the sensor signals are associated with the same area of the sensed field of the environment. In step S3, the first sensor signal Si is integrated over predetermined temporal limits, and weighted and integrated over predetermined spatial limits. In the invented apparatus, step S3 is performed by the integrator 7 of the integration unit 4. In step S4, the second sensor signal S2 is integrated over predetermined temporal limits, and weighted and integrated over predetermined spatial limits. In the invented apparatus, step S4 is performed by the integrator 8 of the integration unit 4. In step S5, a gain signal is generated based on the integrated signals IS1g, IS2g produced by steps S3 and S4. In the invented apparatus, step S5 is performed by the gain control unit 2. More specifically, the integrated signals IS1g, IS2g generated in steps S3 and S4 are input to a predetermined gain control function that maps these signals to a corresponding output signal. The output signal derived from the gain control function is multiplied by a predetermined gain factor, to generate the gain signal GC. In step S6, the first sensor signal S1 is integrated over predetermined temporal limits, and weighted and integrated over spatial limits (generally different from those of step S3) to generate an integrated signal IS1f. In the invented apparatus, step S6 is performed by the integrator 9. In step S7, the second sensor signal is integrated over predetermined temporal limits, and weighted and integrated over predetermined spatial limits, to generate an integrated signal IS2f. In the invented apparatus, step S7 is performed by the integrator 10 of the integration unit 4. In step S8, the integrated first and second sensor signals generated in steps S6 and S7, and the gain signal generated in step S5, are fused together to generate the fused signal F1, F2. In the invented apparatus, step S8 is performed by the fusion unit. More specifically, the cell confidence levels of the integrated signals from respective integrators 9, 10 and the gain control unit 2, are mapped in the fusion unit 3 to a fused signal level based on the predetermined fusion function programmed into the unit 3.

In step S9, the fused signal is output, for example, to an external target tracking system, and, in step S10, the invented method and the processing of the invented apparatus terminates.

The fused signal generated by the processing of FIG. 11 is highly-indicative of target existence and position at a given time, and can used in a wide variety of applications. For example, the fused signal can be supplied to an external target tracking system for further processing. The method or processing of FIG. 11 is preferably repeated at regular intervals that depend upon the application to which the subject invention is applied. For example, for relatively fast targets such as air- or space-craft, or ships or land vehicles that are moving in the sensed environment, the preferred repetition period of the method is less than one second to generate the levels for all cells of the fused sensor signal from corresponding cell levels of the sensor signals. In addition, the method can be performed with sensor signals of one-, two- or three- or more dimensions. Also preferred, the spatial and temporal limits of the integrating steps S3 and S4 are the same in extent. Similarly, the spatial and temporal limits of the integrating steps S6 and S7 are preferred to be the same. However, the extent of the temporal and spatial limits of the integrating steps S3, S4 are preferably greater than those of integrating steps S6, S7.

The invented apparatus and method can readily be extended for use with more than two sensors by inclusion in the integration unit 4 of two additional integrators per added sensor, and appropriate configuration of the subunits 19, 21 of the gain control unit 2 and the fusion unit 3, respectively, to accommodate the additional integrated signals for the added sensor.

In the description of the invented apparatus and method given hereinabove, 'targets' have been assumed to be the objects of interest in the sensor signals. However, the invented apparatus and method can be used to extract any feature (including targets) that may be present in a sensed environment.

The many features and advantages of the present invention are apparent from the detailed specification and thus, it is intended by the appended claims to cover all such features and advantages of the described apparatus and methods which follow in the true spirit and scope of the invention. Further, since numerous modifications and changes will readily occur to those of ordinary skill in the art, it is not desired to limit the invention to the exact construction and operation illustrated and described. Accordingly, all suitable modifications and equivalents may be resorted to as falling within the spirit and scope of the invention.

We claim:

1. A method comprising the steps of:
   a) integrating a first sensor signal;
   b) integrating a second sensor signal;
   c) generating a gain signal, based on the integrated first and second sensor signals generated in said steps (a) and (b), respectively; and
   d) generating a fused signal, based on the first and second sensor signals, and the gain signal generated in said step (c).

2. A method as claimed in claim 1, further comprising the step of:
   e) integrating the first sensor signal for use in generating the fused signal in the performance of said step (d); and
   f) integrating the second sensor signal for use in generating the fused signal in the performance of said step (d).

3. A method as claimed in claim 2, wherein the spatial limits of integration of said steps (a) and (b) are greater than the spatial limits of integration of said steps (e) and (f).

4. A method as claimed in claim 2, wherein the temporal limits of integration of said steps (a) and (b) are greater than the temporal limits of integration of said steps (e) and (f).

5. A method as claimed in claim 2, further comprising the step of:
   g) weighting at least one of said first and second signals during the performance of at least one of said steps (a), (b), (e) and (f).

6. A method as claimed in claim 5, wherein said step (g) is performed with difference-of-gaussian weighting.

7. A method as claimed in claim 2, wherein the first and second signals are indicative of whether a target exists, the fused signal more indicative of whether the target exists than either of the first and second signals considered individually.

8. A method as claimed in claim 2, wherein the first and second signals are indicative of a target position at a predetermined time, the fused signal having a greater confidence of the target position at the predetermined time than either of the first and second signals considered individually.

9. A method as claimed in claim 2, wherein the first and second signals have respective confidences of whether two closely spaced detections are one target or more than one target relatively closely spaced, and the fused signal has an improved confidence relative to the confidences of the first and second signals.

10. A method as claimed in claim 2, wherein at least one of the steps (a), (b), (e) and (f) includes a substep of using a predetermined transfer function to generate at least one of the integrated first and second sensor signals used in the performance of said steps (c) and (d).

11. A method as claimed in claim 10, wherein the transfer function includes a range normalization function.

12. A method as claimed in claim 10, wherein the transfer function includes a scaled sigmoid function.

13. A method as claimed in claim 2, wherein said step (c) includes a substep of:
   c1) inputting the integrated first and second sensor signals into a predetermined gain control function to generate the gain signal.

14. A method as claimed in claim 13, wherein said step (c) includes a substep of:
   c2) multiplying the signal output from the gain control function by a predetermined gain factor, to generate the gain signal.

15. A method as claimed in claim 13, wherein said step (c) further comprises the substep of:

c2) selecting the predetermined gain control function used in the substep (a1) from among a plurality of gain control functions.

16. A method as claimed in claim 2, wherein said step (d) includes the substeps of:

d1) inputting the integrated signals generated by said steps (e) and (f) into a predetermined fusion function to generate the fused signal.

17. A method as claimed in claim 16, wherein said step (d) further comprises the substep of:

d2) selecting the predetermined fusion function used in the substep (d1) from among a plurality of fusion functions.

18. A method as claimed in claim 1, wherein said steps (c) and (d) are performed in one-dimension.

19. A method as claimed in claim 1, wherein said steps (c) and (d) are performed in two-dimensions.

20. A method as claimed in claim 1, wherein said steps (c) and (d) are performed in three-dimensions.

21. An apparatus for use with first and second sensor signals from first and second sensors, respectively, that sense a target in an environment, the apparatus comprising:

an integration unit coupled to receive the first and second sensor signals, generating first integrated signals based on the first and second sensor signals, and generating second integrated signals based on the first and second sensor signals;

a gain control unit coupled to receive the first integrated signals, and generating a gain signal based on the the first integrated signals; and a fusion unit coupled to receive the gain signal from the gain control unit, and coupled to receive the second integrated signals from the integration unit, the fusion unit generating a fused signal, based on the gain signal and the second integrated signals.

22. An apparatus as claimed in claim 21, wherein the integration unit performs weighting of the first and second sensor signals to generate at least one of the first and second integrated signals.

23. An apparatus as claimed in claim 22, wherein the weighting is difference-of-gaussian weighting.

24. An apparatus as claimed in claim 21, wherein the integration unit integrates the first and second sensor signals over predetermined spatial limits of integration to produce at least one of the first and second integrated signals.

25. An apparatus as claimed in claim 21, wherein the integration unit integrates the first and second sensor signals over predetermined temporal limits of integration to produce at least one of the first and second integrated signals.

26. An apparatus as claimed in claim 21, wherein the integration unit generates at least one of the first and second integrated signals using a predetermined transfer function.

27. An apparatus as claimed in claim 26, wherein the transfer function is a range normalization function.

28. An apparatus as claimed in claim 26, wherein the transfer function is a scaled sigmoid function.

29. An apparatus as claimed in claim 21, further comprising:

a first sensor coupled to the integration unit, and sensing the environment to generate the first sensor signal; and a second sensor coupled to the integration unit, and sensing the environment to generate the second sensor signal.

30. An apparatus as claimed in claim 21, wherein the gain control unit inputs the first integrated signals into a predetermined fusion function to generate the gain signal.

31. An apparatus as claimed in claim 21, wherein the fusion unit inputs the second integrated signals into a predetermined fusion function to generate the fused signal.

* * * * *